United States Patent

[11] 3,588,443

[72] Inventor: Wallace C. Johnson, Wilmington, N.C.
[21] Appl. No.: 883,757
[22] Filed: Dec. 10, 1969
[45] Patented: June 28, 1971
[73] Assignee: Arcos Corporation, Philadelphia, Pa.
Continuation-in-part of application Ser. No. 617,239, Feb. 20, 1967.

[54] ELECTRIC ARC OVERLAY WELDING
6 Claims, 5 Drawing Figs.

[52] U.S. Cl. ................................................ 219/137,
219/145
[51] Int. Cl. ................................................ B23k 9/00
[50] Field of Search ................................ 219/73, 76, 145, 146, 130, 137; 29/192, 193; 148/22—24

[56] References Cited
UNITED STATES PATENTS

| | | | |
|---|---|---|---|
| 3,102,025 | 8/1963 | Wilcox | 219/145X |
| 3,177,340 | 4/1965 | Danhier | 219/146 |
| 3,223,818 | 12/1965 | Chyle | 219/73 |
| 3,309,490 | 3/1967 | Cary | 148/26X |
| 3,466,417 | 9/1969 | Chapman et al. | 219/137X |

Primary Examiner—J. V. Truhe
Assistant Examiner—C. L. Albritton
Attorney—William Steell Jackson and Sons

ABSTRACT: Electric arc overlay welding, often called arc cladding, on a metallic backing which in many cases will be a steel backing. A barrier strip rests on the backing and a strip electrode spaced from the backing arcs to the barrier strip. The barrier strip or the strip electrode made by powder metallurgy has a metal oxide such as iron oxide included in it which oxidizes carbon picked up from the metal backing.

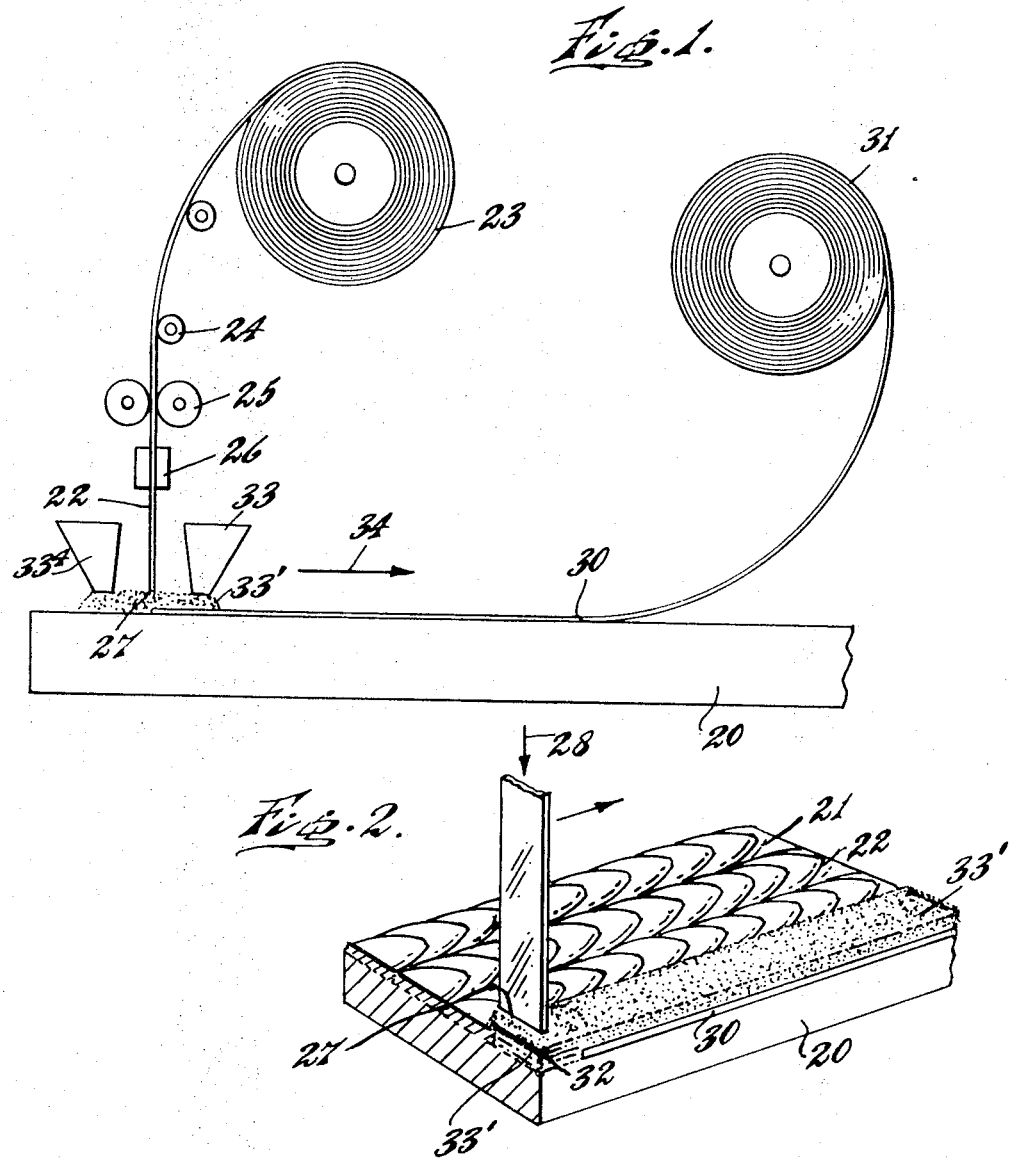
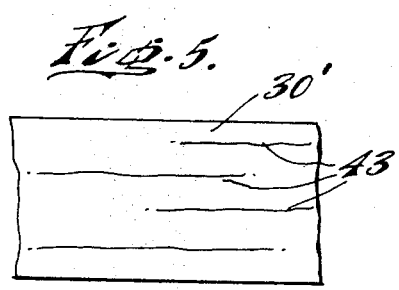

PATENTED JUN 28 1971

INVENTOR.
Wallace C. Johnson
BY
ATTORNEYS

ELECTRIC ARC OVERLAY WELDING

This application is a continuation-in-part which includes subject matter divided from my copending application Ser. No. 617,239, filed Feb. 20, 1967 for Electric Arc Overlay Welding.

DESCRIPTION OF THE INVENTION

The present invention relates to electric arc overlay welding, often called arc cladding, on a metallic backing.

A purpose of the invention is to lower the carbon pickup by including a metallic oxide such as oxide of iron, oxide of chromium or oxide of nickel in the composition of the power metal electrode, the powder metal barrier strip or both.

A further purpose is to produce sound overlays, free from cracks and inclusions, and with low dilution.

Further purposes appear in the specification and in the claims.

The drawings illustrate a few only of the numerous embodiments in which the invention may appear, selecting the forms shown from the standpoints of convenience in illustration, satisfactory operation and clear demonstration of the principles involved.

FIG. 1 is a diagrammatic elevation of mechanism for overlay welding according to the invention.

FIG. 2 is a fragmentary perspective to enlarged scale showing the making of an overlay weld according to the invention.

FIG. 5 is a diagrammatic plan view of a modified form of barrier strip according to the invention.

Figure 4:
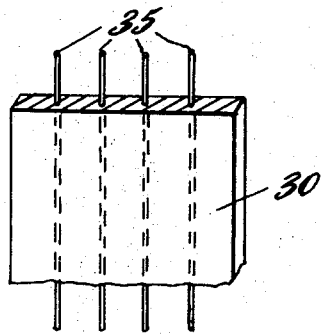
FIG. 4 is a fragmentary perspective of the barrier strip of FIG. 3.

In the prior art of overlay welding, green or sintered powder metal electrodes and barrier strips have been proposed in FIG. 33 of my U.S. Pat. No. 3,271,554, granted Sept. 6, 1966, for Overlay Welding. The paper by Nerodenko and Frumin appearing in 9 Avtomaticheskaya Svarka 31 (Sept. 1964), and translated by BWRA refers to Powder Metallurgy Strip Electrodes for Overlay Welding.

In the program of experimental work using powder metallurgy strip electrodes and powder metallurgy barrier strips for overlay welding, a number of practical difficulties have been observed which have proved to be hard to overcome.

Where the barrier strip and/or the strip electrode arc of green powder metal, which has been compacted but not sintered, the strip is relatively weak, and prone to crack or break, interrupting operation.

Where a green unreinforced powder metal strip electrode has been used with considerable "stickout," there has been a tendency for the electrode to simply break off in increments and deposit short sections of unmelted electrode in the weld pool, leading to discontinuity in welding. When a green unreinforced powder metal strip is used as an electrode, it must be remembered that not only is it weakened by the $RI^2$ heating in the "stickout" portion, but it must push through a fairly thick deposit of flux, which is often of the order of 2 inches deep in submerged arc welding.

Where thick sintered powder metal strip has been used as the barrier strip, and also where conventional wrought solid strip has been so used, particularly where the metallic backing is not absolutely flat, as in a tank or shell, there has been a tendency for the barrier strip not to conform to the metallic backing, sometimes resulting in poor bond between the overlay and the metallic backing. Even where the metallic backing is a flat plate, it is sometimes difficult to straighten a stiff sintered powder metal barrier strip so that it will lie perfectly flat under the arc.

Where the backing is steel and especially where there is a substantial carbon content in the backing steel, and a considerable dilution of the overlay by the backing results, it is difficult to maintain an adequately low carbon content in a one layer overlay weld. This is particularly a problem in corrosion resistant alloys such as alloys of the stainless steel type in which excessive carbon content interferes seriously with corrosion resistance.

Finally, once the overlay weld is finished, the problem remains of removing the slag.

Where solid wrought strip electrodes and barrier strips have been used, slag removal with proper flux compositions has been easy. But with powder metal strip electrodes and/or barrier strips, slag removal from the flat weld bead surface is a considerable problem, requiring labor in the form of pounding, grinding or chipping.

The present inventor has undertaken experiments to solve these problems. These experiments during a year of work at first achieved limited success.

The inventor particularly has conducted a series of experiments in an effort to improve the construction of the electrode. An attempt was made to manufacture electrode strips which included glass fibers embedded in metallic powders which were compacted and elongated and used in green form (unsintered). This was found to be impractical because the glass fibers ruptured in elongation for example under 40 tons per square inch rolling pressure, and the strip was not strong enough to support itself.

Then an attempt was made to produce strip electrode by embedding aluminum wires in metallic powder having the composition desired for the overlay, the strip being compacted and elongated and used green. These experiments failed as the aluminum wire was incapable of withstanding the high compressive forces and fractured.

An attempt was then made to produce a strip electrode which had stainless steel wires embedded in metallic powder which was compacted and elongated and used in green form. Experiments were also conducted with such strip which was sintered in a reducing gas such as hydrogen or cracked ammonia, and at lower temperatures or for shorter times than would be suitable without the internal fibers or wires.

The resulting green strip and the resulting sintered strip were strong and coherent but when an attempt was made to use them as an electrode, an unexpected effect occurred. The stainless steel wires exploded and disrupted the strip electrode. This is believed to occur because the stainless steel wires had much higher conductivity than the compressed alloy metal powders such as chromium, nickel and iron and therefore there was a distinct tendency for the high welding current to flow through the stainless steel wires, raising them to a very high temperature at which they vaporized and caused the resultant explosion within the green strip.

Experiments indicate, however, that green or unsintered powder metallurgy strip used as a strip electrode can be strengthened by including, buried in the strip, longitudinally extending fibers of a nonmetallic or organic plastic such as nylon (linear polyamide) or a polyfluorocarbon such as polytetrafluoroethylene (Teflon), the copolymer of tetrafluoroethylene with 5 to 35 percent by weight of hexafluoropropylene (Teflon-FEP) or monochlorotrifluoroethylene (Kel-F). It is important to run the electrode with adequate "stickout" so that the organic plastic will distill off and not react with the weld pool. On the other hand, the plastic is capable of holding the integrity of the strip to a point very close to the point at which the strip will melt in the arc or in the pool.

An effort was then made to apply the knowledge gained by these experiments to making an improved barrier strip and especially one which was highly flexible and would as it uncoiled conform to a curved surface of a backing plate or to irregularities of a backing plate for the purpose of overlaying. In this connection barrier strips were made up which have stainless steel wires running longitudinally through them and are composed of compacted green (unsintered) alloy powders. It was found that these strips are very superior as barrier strips, since the current does not flow longitudinal through them, and, therefore, there is not any tendency to cause heating or an explosion of the stainless steel supporting wires.

It has been found that improved barrier strips can also be made by including other metallic fibrous materials extending longitudinally therein, instead of the stainless steel wires, an example being nickel fibers or iron fibers. A barrier strip of powder metal with longitudinally extending metallic fibers therein has been found to be very flexible and to lie flat when it is in the green or unsintered form without the need to straighten it after it is uncoiled. Moreover, this elimination of sintering saves about one-third of the total cost of preparing the strip.

Such barrier strip can be made in thicknesses in the range of 0.030 to 0.125 and preferable in the thickness range of 0.050 to 0.090 inch. The barrier strip can be effectively made in widths between one-half inch and 6 inches or greater and preferably between three-fourths inch and 3 inches, a desirable width for many cases being about 1½ inches. These same dimensions are also suitable for a strip electrode when made from powder, later sintered.

A typical flux composition which is adhering when powder metal strip electrodes and barrier strips are used unless special precautions are taken and which is enabled to part radially by inclusion of deoxidizer in the strip electrode, in the barrier strip and preferably in both, is as follows:

|  | Percent |
|---|---|
| Calcium silicate | 30-60 |
| Mullite | 5-20 |
| Fluorspar | 2-10 |
| Cryolite | 0-10 |
| Zirconium silicate | 0-20 |

This flux is bonded by sodium silicate to agglomerate into desired particles and then dried.

The following table shows examples of specific flux compositions which can to great advantage be made to part from the weld bead by the presence of deoxidizers in the strip electrode or the barrier strip or both:

|  | Neutral flux | Neutral flux | Chromium enriched fluxes | |
|---|---|---|---|---|
| Calcium silicate | 54 | 78 | 43 | |
| Mullite | 16 | 10 | 14 | 20 |
| Zirconium silicate | 16 | | 14 | |
| Fluorspar | 7 | 8 | 6 | 32 |
| Bentonite clay | 2 | 2 | 2 | 2 |
| Cryolite | 5 | | 4 | |
| Ferrochromium | | | 15 | 13 |
| Electrolytic manganese | | 2 | 2 | 3 |
| Alumina | | | | 30 |
| Total (percent) | 100 | 100 | 100 | 100 |
| Sodium silicate binder | (¹) | (¹) | (¹) | (¹) |

¹ Quantity sufficient.

The flux particles were bonded with 18 percent on the weight of the flux of 41° Baume sodium silicate in water, and dried to remove the water.

Experiments have been carried on in an effort to cut down on the increase of carbon in the overlay from a base plate of steel such as carbon steel having a composition of, for example, as much as 0.30 percent carbon.

The carbon pickup in the weld can be lowered by including from 1 to 20 percent, preferably from 2 to 5 percent, by weight of an oxide of the class consisting of an iron oxide, a chromium oxide or a nickel oxide in the powder metal barrier strip or in the powder metal electrode, or both. This definitely lowers the carbon pickup of the overlay by reaction in which the oxide reacts with carbon to form carbon monoxide and liberate the corresponding metal. The preferred oxide is red iron or ferric oxide in a percentage of 1 to 20 percent by weight, preferably 2 to 5 percent.

FIG. 1 shows an overlay welding device of the invention which may, for example, conform to my U.S. Pat. No. 3,271,554, granted Sept. 6, 1966, for Overlay Welding, incorporated herein by reference.

FIGS. 1 and 2 show a backing plate 20 on which an overlay 21 is being deposited, using a powder metal strip electrode 22, taking the strip from a coil 23, over suitable guide rollers 24, advancing it in the direction of arrow 28 by a motorized electrode feed device 25 and introducing welding current into it by contacts 26. The plate 20, as well known, is electrically grounded, creating an arc at 27.

Powder metal barrier strip 30 comes from a coil 31 and is laid on the backing plate 20 ahead of the arc as shown in FIGS. 1 and 2, so as to create a weld pool 32 by melting all of the metal from the electrode, all of the metal from the barrier strip and a small amount of surface metal from the backing plate 20. Powdered flux 33' is supplied through suitable flux feeders 33 and 33⁴ ahead of and behind the arc. The arc moves forward by advance of the electrode and is self-oscillating. The arc moves over the barrier strip and with the flux feeders in the direction of the arrow 34. There is a cover of molten slag forming on the weld pool 32 and this solidifies to produce a slag deposit on top of the overlay 21.

Figure 3:
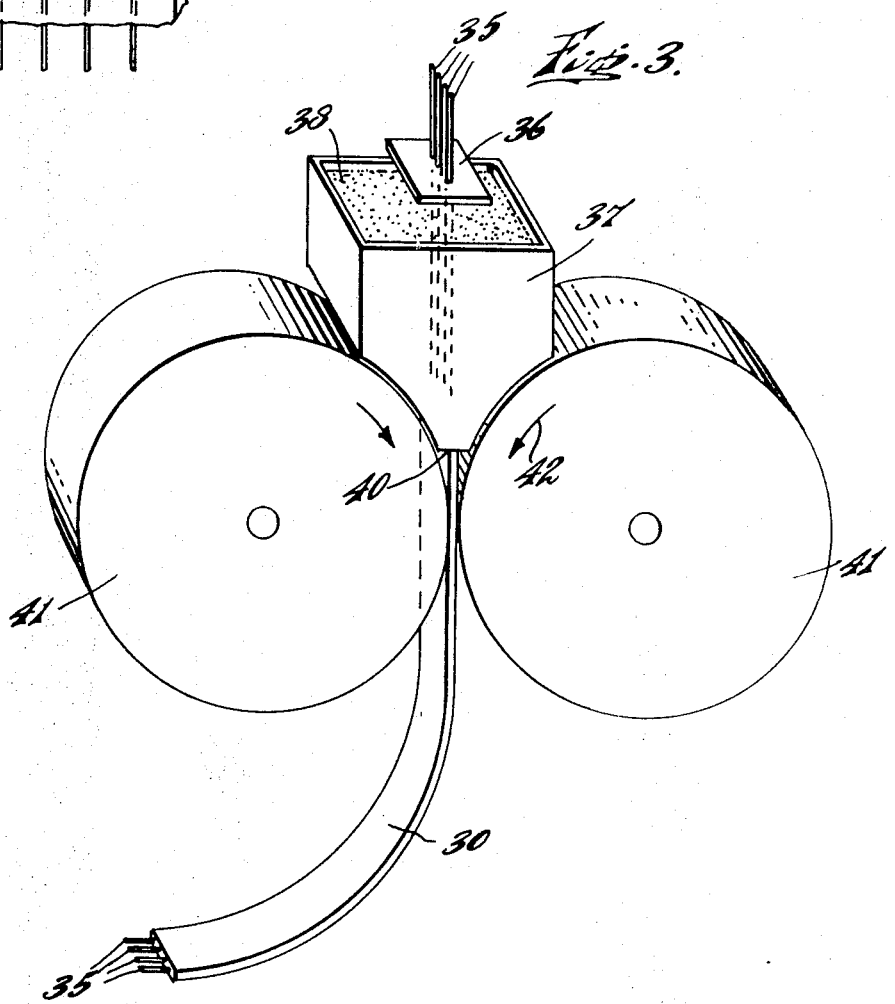
FIG. 3 is a diagrammatic perspective showing the forming of a barrier strip according to one embodiment of the invention.

In the preferred embodiment, a green or unsintered powder metallurgy barrier strip is produced as shown in FIG. 3, feeding suitable fibers or in this case suitable fine wires 35 from a convenient source such as coils through an optional guide 36 into a hopper 37 into which metal powder or powders 38 has been fed, the metal powder suitably being blended to include the desired composition, for example alloying ingredients, iron where appropriate, and deoxidizer, together with the powder 38, metallic fibers or chopped-up wires may be used.

The metal powder discharges from the bottom of the hopper at 40 surrounding the wires and passes between the bight of rolls 41 which are driven in the direction shown by the arrows 42. There are suitable edge guides, not shown for the purpose of illustrating better the creation of the barrier strip 30, which has the wires 35 extending longitudinally and embedded therein.

Where the overlay is of a chromium and nickel composition or a nickel composition, the wires 35 are preferably of a suitable grade of stainless steel.

Of course, it will be evident that various compositions of powder may be used for making up the powder metal components of the barrier and/or electrode strip, a suitable example being as follows in percentage by weight:

|  | Percent |
|---|---|
| Ferrochrome (70% chromium) | 34 |
| Nickel | 10 |
| Manganese | 2 |
| Aluminum | 1 |
| Iron | Balance |

In this case the wires can conveniently be of Type 309, 304 or 308 stainless steel.

The barrier strip 30 produced in FIG. 3 is shown more clearly in FIG. 4. This is a highly flexible strip which is nevertheless quite adequately strong. When it unrolls it does not have to be straightened and will conform to any curvature or discontinuity of the backing plate.

If offers the advantages of a high degree of flexibility, sufficient strength and adaptability in composition since it can be produced as it is used or shortly before it is used.

FIG. 5 illustrates a modified form of barrier strip 30' which instead of having continuous wires extending therethrough has a series of fibers 43 which are introduced in the hopper 37 and which, if desired, can be arranged longitudinally in the green powder metal barrier strip. These fibers can be of any suitable metal such as nickel or iron.

It will be evident that the invention can be applied as a means of improving overlay welding of any one of a wide variety of alloys such as chromium-nickel alloys, nickel alloys, chromium-nickel-iron alloys, nickel-iron alloys, copper base alloys, cobalt base hard-surfacing alloys, and numerous other ferrous and nonferrous overlay alloys on backings either of ferrous or nonferrous alloys, the backings preferably being carbon steel, low alloy steel, or high-alloy steel. The invention is applicable also for overlaying the insides or outsides of cylinders and pressure vessels which have a substantial amount of curvature.

EXAMPLE 1

In this case the barrier strip had the following composition by weight, the barrier strip being green

|  | Percent |
|---|---|
| Chromium | 25% |
| Nickel | 14 |
| Manganese | 0.5-3 |
| Aluminum | 0.5-1.5 |
| Iron | Balance |

The barrier strip contained four 0.020-inch diameter longitudinal Type 308 L stainless steel wires.

The electrode was Type 308 L stainless sintered powder metallurgy strip, 0.030×1½ inches.

Suitable welding conditions are 1,000 to 1,200 amperes at 28 to 34 volts direct current straight polarity, speed of progression 10 to 20 inches per minute, electrode 0.030×2 inches, barrier strip 0.075×1½ inches.

The barrier strip was flexible and lay flat on the backing plate.

EXAMPLE 2

Example 1 is repeated including 3 percent of $Fe_2O_3$ in the powder metal barrier strip. The carbon content of the weld is lowered.

EXAMPLE 3

The procedure of example 1 is repeated including 3 percent of $Fe_2O_3$ in the powder metal electrode. The carbon content of the weld is lowered.

All percentages except porosity are percentages by weight. Porosity is expressed in percentage by volume.

When reference is made to fibers which extend in a powder metallurgy strip, it will be understood that this is intended to include fibers which may be short and also fibers which may be of indefinite length like wires, threads, yarn, or the like. When the fibers are of a nonmetallic material such as plastic, they might in certain cases be more appropriately described as filaments, threads, slub, roving, yarn or strands.

The principles of the invention can be applied to various types of welding, where the objective may be overlaying or arc cladding, join, remelting, depositing ingots or billets, or otherwise. The particular method in many cases will be the submerged arc welding method, but it will be evident that the principles of the invention may be applied to open arc which has the advantage of high visibility, to gas-shielded or protected open arc, to Mig welding, Tig welding, and electrode welding.

In view of my invention and disclosure, variations and modifications to meet individual whim or particular need will doubtless become evident to others skilled in the art to obtain all or part of the benefits of my invention without copying the apparatus and composition shown, and I, therefore, claim all such insofar as they fall within the reasonable spirit and scope of my claims.

Having thus described my invention what I claim as new and desire to secure by Letters Patent is:

I claim:

1. A process of overlay welding of a steel backing plate by an alloy which would be impaired by inclusion of excess carbon, which comprises advancing a strip electrode of such an alloy longitudinally down toward the steel backing plate, the strip electrode essentially consisting of compressed metal powder and including from 1 to 20 percent by weight of an oxide of the class consisting of oxides of iron, oxides of chromium, and oxides of nickel, distributed throughout the metal powder, applying a welding potential between the strip electrode and the backing plate to create an arc which melts the strip electrode and a portion of the backing plate, progressing the strip electrode and the arc to form an overlay weld bead, and oxidizing carbon from the backing plate to reduce the carbon pickup in the weld bead.

2. A process of claim 1, in which the content of oxide is from 2 to 5 percent.

3. A process of claim 1, in which said oxide is ferric oxide.

4. A process of overlay welding of a steel backing plate by an alloy which would be impaired by inclusion of excess carbon, which comprises advancing a strip electrode of such an alloy longitudinally toward the steel backing plate, laying down on the backing plate opposite the strip electrode a barrier strip comprising compressed metal powder and including from 1 to 20 percent by weight of an oxide of the class consisting of oxides of iron, oxides of chromium and oxides of nickel, applying a welding potential between the strip electrode and the backing plate to create an arc which melts the strip electrode, the barrier strip and a portion of the backing plate, progressing the strip electrode and the arc to form an overlay weld bead and oxidizing carbon from the backing plate to reduce the carbon pickup in the weld bead.

5. A process of claim 4, in which the strip electrode comprises compressed metal powder and including from 1 to 20 percent by weight of said oxide.

6. A process of claim 4, in which the content of oxide in the barrier strip is from 2 to 5 percent.

PO-1050
(5/69)

UNITED STATES PATENT OFFICE
CERTIFICATE OF CORRECTION

Patent No. 3,588,443          Dated  June 28, 1971

Inventor(s)    Wallace C. Johnson

It is certified that error appears in the above-identified patent and that said Letters Patent are hereby corrected as shown below:

Column 1, line 46, "arc" should read - are - ; column 5, line 6 delete "%" after - 25 - ; column 5, line 43, "join" should read - joining - ; column 5, line 48, "electrode" should read - electrogas - .

Signed and sealed this 18th day of January 1972.

(SEAL)
Attest:

EDWARD M. FLETCHER, JR.          ROBERT GOTTSCHALK
Attesting Officer                Acting Commissioner of Patents